US012767223B2

(12) United States Patent
Mihalache et al.

(10) Patent No.: US 12,767,223 B2
(45) Date of Patent: Oct. 20, 2026

(54) STEERING KNUCKLE, CORNER MODULE AND VEHICLE

(71) Applicant: Continental Automotive Technologies GmbH, Hannover (DE)

(72) Inventors: Alexandru Mihalache, Iasi (RO); Ionut-Sergiu Istrati, Iasi (RO); Alexandru Paval, Iasi (RO); Radu-Ciprian Sipos, Bacau (RO)

(73) Assignee: CONTINENTAL AUTOMOTIVE TECHNOLOGIES GMBH, Hannover (DE)

(*) Notice: Subject to any disclaimer, the term of this patent is extended or adjusted under 35 U.S.C. 154(b) by 230 days.

(21) Appl. No.: 18/667,226

(22) Filed: May 17, 2024

(65) Prior Publication Data

US 2024/0383531 A1 Nov. 21, 2024

(30) Foreign Application Priority Data

| | | |
|---|---|---|
| May 17, 2023 | (EP) | 23465513 |
| Dec. 5, 2023 | (EP) | 23465567 |
| Dec. 19, 2023 | (EP) | 23465577 |

(51) Int. Cl.

*B62D 7/18* (2006.01)
*B60B 27/00* (2006.01)
(Continued)

(52) U.S. Cl.

CPC ............ *B62D 7/18* (2013.01); *B60B 27/0052* (2013.01); *B60G 7/005* (2013.01); *B60K 7/0007* (2013.01);
(Continued)

(58) Field of Classification Search

CPC .......... B62D 7/18; B62D 7/20; B62D 5/0418; B60B 27/0052; B60B 27/0015;
(Continued)

(56) References Cited

U.S. PATENT DOCUMENTS

| | | | |
|---|---|---|---|
| 4,162,859 | A | 7/1979 | McAfee |
| 7,377,529 | B2 | 5/2008 | Green |

(Continued)

FOREIGN PATENT DOCUMENTS

| | | |
|---|---|---|
| CN | 102689576 A | 9/2012 |
| CN | 204432764 | 7/2015 |

(Continued)

OTHER PUBLICATIONS

National search report dated Jun. 10, 2024 for related German application No. 10 2023 212 301.0.

(Continued)

*Primary Examiner* — Edwin A Young
(74) *Attorney, Agent, or Firm* — Buchanan Ingersoll & Rooney P.C

(57) ABSTRACT

A steering knuckle for a vehicle wheel includes a wheel connection section, an upper steering attachment section, and a lower steering attachment section. The wheel connection section is configured for connecting the steering knuckle to the vehicle wheel. The upper steering attachment section is configured to provide a connection of the steering knuckle to a steering drive. The steering knuckle is intended to permit wheel-specific steering with a large steering angle and, at the same time, to support the integration of other vehicle wheel components. The upper steering attachment section, the wheel connection section, and the lower steering attachment section together delimit a recess on at least three sides such that a connector section arranged in the wheel connection section delimits an inner end of the recess and is configured for guiding at least one line through the recess.

14 Claims, 7 Drawing Sheets

(51) Int. Cl.

| | |
|---|---|
| ***B60G 7/00*** | (2006.01) |
| ***B60K 7/00*** | (2006.01) |
| ***B60T 17/04*** | (2006.01) |
| ***B62D 5/04*** | (2006.01) |
| ***B62D 7/20*** | (2006.01) |
| *F16D 55/226* | (2006.01) |

(52) U.S. Cl.
CPC ............ *B60T 17/04* (2013.01); *B62D 5/0418* (2013.01); *B62D 7/20* (2013.01); *B60B 27/0015* (2013.01); *F16D 55/226* (2013.01)

(58) Field of Classification Search
CPC ....... B60G 7/005; B60K 7/0007; B60T 17/04; F16D 55/226
See application file for complete search history.

(56) References Cited

U.S. PATENT DOCUMENTS

| | | | | |
|---|---|---|---|---|
| 8,092,095 | B2 * | 1/2012 | Hattori .................. | F16C 33/583 384/504 |
| 10,625,778 | B2 | 4/2020 | Buchwitz et al. | |
| 11,597,438 | B1 * | 3/2023 | Payne .................... | B62D 5/061 |
| 2005/0258608 | A1 | 11/2005 | McGaughy | |
| 2013/0153326 | A1 | 6/2013 | Yamamoto et al. | |
| 2013/0193659 | A1 | 8/2013 | Fuks et al. | |
| 2014/0353054 | A1 | 12/2014 | Matayoshi et al. | |
| 2019/0248203 | A1 | 8/2019 | Krehmer et al. | |
| 2020/0070883 | A1 | 3/2020 | Du | |
| 2021/0394610 | A1 | 12/2021 | Kim | |
| 2022/0001846 | A1 | 1/2022 | Kim | |
| 2023/0182520 | A1 | 6/2023 | Kraus et al. | |
| 2023/0302860 | A1 * | 9/2023 | Jeon ......................... | B60G 3/20 |

FOREIGN PATENT DOCUMENTS

| | | | |
|---|---|---|---|
| CN | 106741144 | A | 5/2017 |
| CN | 109291754 | A | 2/2019 |
| DE | 103 06 228 | A1 | 9/2004 |
| DE | 102014202914 | A1 | 8/2015 |
| DE | 10 2015 220 776 | A1 | 4/2017 |
| DE | 102016221206 | B4 | 5/2018 |
| DE | 102017106810 | A1 | 10/2018 |
| DE | 102018129734 | A1 | 5/2020 |
| DE | 102020112535 | A1 | 11/2021 |
| DE | 102020131008 | A1 | 12/2021 |
| DE | 102021115969 | A1 | 12/2022 |
| DE | 102021122221 | A1 | 3/2023 |
| DE | 102021125497 | A1 | 4/2023 |
| JP | 2005329763 | A | 12/2005 |
| JP | 2012-045989 | A | 3/2012 |
| JP | 2013-103665 | A | 5/2013 |
| KR | 20220094753 | A | 7/2022 |
| KR | 10-2022-0108559 | A | 8/2022 |
| KR | 10-2022-0151948 | A | 11/2022 |
| WO | 2019139545 | A1 | 7/2019 |
| WO | 2020042366 | A1 | 3/2020 |
| WO | 2021093693 | A1 | 5/2021 |

OTHER PUBLICATIONS

International Search report dated Jun. 13, 2024 of Counterpart European application No. 23465577.7.

Korean Office Action dated Sep. 17, 2025 for the counterpart Korean Patent Application No. 10 2024 0051358 and machine translation of same.

German Search Report issued Feb. 1, 2024, by the German Patent Office in corresponding German Patent Application No. 10 2023 205 697.6 and an English machine translation of the Search Report. (16 pages).

Office Action (Request for the Submission of an Opinion) issued Jun. 18, 2026, by the Korean Intellectual Property Office in corresponding Korean Patent Application No. 10-2024-0162226 and an English translation of the Office Action. (8 pages).

Office Action (Written Decision on Registration) issued Jun. 30, 2026, by the Korean Intellectual Property Office in corresponding Korean Patent Application No. 10-2024-0051358 and an English translation of the Office Action. (8 pages).

* cited by examiner

STEERING KNUCKLE, CORNER MODULE AND VEHICLE

CROSS-REFERENCE TO RELATED APPLICATIONS

This application claims priority to European patent application No. EP23465513, filed on May 17, 2023, European patent application No. EP23465567, filed on Dec. 5, 2023, and European patent application No. EP23465577, filed on Dec. 19, 2023, each of which is hereby incorporated by reference.

TECHNICAL FIELD

The technical field relates generally to a steering knuckle for a vehicle wheel, a corner module including such a steering knuckle, and to a vehicle having at least two such corner modules.

BACKGROUND

One steering knuckle is known, for example, from CN 106 741 144 A, which furthermore discloses an independent four-wheel steering system. The steering system comprises a double wishbone steering knuckle, with a steering motor being connected to an upper arm. The steering motor is connected to an upper steering attachment section of the steering knuckle, which merges into a wheel connection section. A lower arm is connected to the steering knuckle by a ball joint. This solution permits a relatively large maximum steering angle.

Although a steering knuckle of this type can provide a larger steering angle compared to other known steering knuckles and can permit wheel-specific steering, a solution for the integration of wheel systems that are becoming ever more increasingly complex, e.g. with brakes, sensors, wheel hub motor, etc., is not provided. Furthermore, the solution of the wheel suspension is highly space-intensive, not very stable and does not provide integration of a suspension.

U.S. Pat. No. 10,625,778 B2 discloses a steering arrangement with a steering knuckle, which provides for the integration of a drum brake or disc brake, but not a wheel hub motor. Furthermore, no wheel-specific steering is provided and the design of the steering arrangement and of the steering knuckle is highly complex and comprises a multiplicity of components.

A wheel hub motor with an integrated disc brake is also known from the WO 2019/139 545 A1. A steering knuckle covers an x-shaped stator plate, wherein both leave a recess free for a brake caliper of the disc brake in the direction of rotation of the vehicle wheel. Cooling lines and power supply lines are guided past the stator plate and the steering knuckle at different angles of rotation. No solution is provided for a wheel-specific steering attachment or steering with a large steering angle.

As such, it is desirable to present a steering knuckle and a steering attachment of a vehicle wheel which permits wheel-individual steering with a large steering angle and at the same time supports the integration of further vehicle wheel components, such as a wheel brake and/or a wheel hub motor. In addition, other desirable features and characteristics will become apparent from the subsequent summary and detailed description, and the appended claims, taken in conjunction with the accompanying drawings and this background.

SUMMARY

According to a first aspect of the disclosure, a steering knuckle is provided, wherein the upper steering attachment section, the wheel connection section, and the lower steering attachment section together delimit a recess on at least three sides such that a connector section arranged in the wheel connection section delimits an inner end of the recess and is configured for guiding at least one line through the recess.

A steering knuckle configured in such a manner together with the recess, which is delimited on three sides, forms a protected region which ends at an inner end (facing the vehicle wheel) in the connector section. This allows lines to be guided through the steering knuckle into the vehicle wheel, while being able at the same time to provide space for protected elastic deformations of the line(s) during a steering movement of the vehicle wheel. For example, power supply lines for a wheel hub motor, coolant lines and hydraulic brake lines are generally less flexible than simple signal lines (which may also however be meant by the line) and therefore require a larger bending radius in order to withstand without damage a steering movement of the vehicle wheel with a large steering angle. The solution according to the invention frames the recess substantially on the wheel side by the wheel connection section, from below through the lower steering attachment section and from above by the upper steering attachment section. As a result, the line (or the lines) is (or are) protected from three sides and nevertheless does not (or do not) collide with the steering knuckle during a large-angled) (>45°) steering movement carried out by the steering drive. It is also possible to connect the line(s) as centrally as possible (with a small radius) and axially within the wheel rim.

Furthermore, an axis of rotation of the steering drive may run through the recess, as a result of which it can be easier to ensure that an elastic deformation of the line(s) occurs largely or completely within the recess or below the upper steering connection section during a steering movement.

The steering knuckle may be formed in one piece. The wheel connection section, the upper steering attachment section and the lower steering attachment section are formed as one continuous component. For example, the steering knuckle can be produced as a cast piece, for example, from aluminum. As a result, the steering knuckle is particularly stable and installation is simplified because of a smaller number of components compared to the state of the art.

If this application refers to "above" or "below", this refers to the usual orientation of an element when installed on the vehicle, merely for illustration. In the absence of a description to the contrary, the term radially or axially refers to a cylindrical coordinate description of the vehicle wheel, with the axis of rotation of the wheel as the z axis and the radius as the vertical distance from the axis of rotation of the wheel.

The connector section may include at least one connector opening through which at least one line and/or a connector for a line can be guided. A plurality of connector openings for a plurality of lines may also be provided. It is also possible for one of the connector openings to be provided for a plurality of lines, for example for a double cable of a power supply line of a wheel hub motor.

The connector section may be located in a shell base of a shell-shaped section of the steering knuckle. In some sections, the recess may then even be surrounded on five sides by the steering knuckle. This creates a protected region for guiding or for connecting the at least one line. The shell-shaped section my be configured to be completely arranged in the axial direction within a wheel rim of a vehicle wheel (the same may apply to the use of the steering knuckle in the corner module).

In one embodiment, the upper steering attachment section, the wheel connection section and the lower steering attachment section together have a substantially C-shaped cross section in a side view of the steering knuckle. This shape provides protection for the at least one line and at the same time allows sufficient horizontal pivoting space for a lower wheel carrier which is connected to the lower steering attachment section and which can move partially within the recess. For example, a C shape allows large steering angles of up to ±90° and more. Particularly preferably, the C shape is a rounded C shape. This improves the force flux and makes the steering knuckle more stable.

In one embodiment, the connector opening is a fluid connector which includes a bore running in the connector section, wherein a first connector end is arranged substantially parallel to, but offset from, a second connector end. "Offset" should be understood here in particular as meaning shifted (outward) in the radial direction. Thus, a fluid line guided through the recess can be fastened at a smallest possible radial distance from the axis of rotation of the wheel, as a result of which the elastic deformation of the fluid line proceeds as symmetrically as possible during a steering movement and the maximum elastic deformation of the fluid line is limited. At the same time, it is possible to conduct the fluid to another desired radial or axial position inside the vehicle wheel without a fluid line having to be bent. For example, for cooling the wheel hub motor or its electronics, a line of cooling fluid is often required at larger radial distances from the axis of rotation of the wheel. Two fluid connectors may be provided, with one fluid connector being configured as an inflow and one fluid connector as an outflow. However, the fluid line may also be a hydraulic line of a hydraulic brake.

In one embodiment, the wheel connection section includes at least one brake connection geometry for connecting to a brake caliper of a disc brake. The steering knuckle may be configured such that a brake caliper engaging around the brake disc from radially on the inside is fastened to the steering knuckle via the at least one brake connection geometry. This solution allows a simple, space-saving and stable installation of the brake caliper of the disc brake. For example, a brake actuator of the brake caliper can be arranged axially completely within the wheel rim, that is, can be rotated toward the inside of the wheel such that said brake actuator does not protrude outward. This means that the brake actuator, depending on the positioning in the direction of rotation, is not in the way of a large-angled steering movement of the vehicle wheel and/or is protected from collisions with a curb. The disc brake may be an electromechanical disc brake. It can alternatively also be a hydraulic disc brake, and then a hydraulic line (for example through the steering knuckle) will also be also necessary.

The lower steering attachment section may include half of a steering knuckle joint, which is configured as a ball joint, for connecting to a lower wheel carrier of a corner module and/or for connecting to a wheel suspension of a vehicle. A ball joint allows rotation about an axis of rotation of the steering drive and also a pitching movement between the steering knuckle and the lower wheel carrier, e.g., in the event of a suspension movement between vehicle wheel and body or possibly in the event of a driving height adjustment.

The wheel connection section may include at least two wheel connection geometries for connecting to the vehicle wheel, wherein at least one connector opening is arranged between the wheel connection geometries. As a result, the line(s) can be guided into/through the steering knuckle at small radial distances from the axis of rotation of the wheel and there is no single central wheel connection geometry occupying this position, by means of a screw. The wheel connection section may include four wheel connection geometries for connecting to the vehicle wheel, wherein the at least one connector opening is arranged between the wheel connection geometries. The wheel connection geometries can, for example, permit the steering knuckle to be fastened to the vehicle wheel via a screw connection, rivet connection, or similar.

The upper steering attachment section may include a substantially circular-disc-shaped steering attachment disk, which frames an upper end of the recess and forms an upper end of the steering knuckle. This allows a relatively large torque to be transmitted from the steering drive to the steering knuckle, even in a compact design of a steering drive. The weight force exerted on the steering knuckle can also be distributed better. The steering attachment disc continues to provide protection from above for the line(s) running through the recess.

In a second aspect of the disclosure, a corner module for a vehicle is provided. The corner module includes a steering knuckle according to any of the embodiments described herein, a vehicle wheel connected to the steering knuckle, and a steering drive which is connected to the upper steering attachment section and is assigned to the individual vehicle wheel. Such a corner module is suitable for permitting wheel-specific steering with a large maximum steering angle) (>45°) and at the same time for guiding one or more lines in a protected manner into the vehicle wheel in order to control or supply one or more wheel components.

In one embodiment, at least one power supply line and/or at least one coolant line for a wheel hub motor arranged in the vehicle wheel runs through the connector section. For power supply and cooling, wheel hub motors require relatively thick and inflexible lines which have a relatively large bending radius. The steering knuckle according to the invention therefore allows a steering attachment with a large steering angle to be provided even when a wheel hub motor is present.

In one embodiment, at least one hydraulic line for a hydraulic brake arranged in the vehicle wheel runs through the connector section. Hydraulic lines are usually under high pressure and, like power supply lines and coolant lines, have a relatively large bending radius. The steering knuckle therefore also allows a steering attachment with a large steering angle to be provided even when a hydraulic brake is present. The hydraulic brake may be a hydraulic disc brake, but may also be a hydraulic drum brake. However, an electromechanical brake (e.g. disc brake or drum brake) may also be utilized.

In one embodiment, the steering drive is configured to provide the vehicle wheel with independent steerability in an angular range of at least ±60°, e.g. of at least ±75°, and may be of at least ±90°, wherein the at least one line carries out elastic deformation about a corresponding angle at least partially in the recess. The steering knuckle together with its recess allows protected elastic deformation of the at least one line, without coming to a collision, overstretching of the line or inelastic deformation of a line during a steering movement.

In one embodiment, the steering knuckle is arranged radially within a disc brake of the vehicle wheel, wherein all of the fastening elements between the steering knuckle and the remaining vehicle wheel are also arranged radially within the disc brake. This embodiment allows easy mounting of the steering knuckle in the corner module and simultaneously accessibility to the brake disk, e.g., for maintenance purposes.

In a third aspect, the disclosure relates to a vehicle including at least two, preferably four, corner modules according to one of the preceding embodiments. This permits extremely flexible novel body concepts, since there is no need for a central engine with a mechanical connection to at least two of the vehicle wheels and mechanical steering and suspension elements between the wheels. At the same time, very large steering angles can be realized, which, for example, permit extremely small turning circles and parking sideways in a parking space.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

Figure 1:
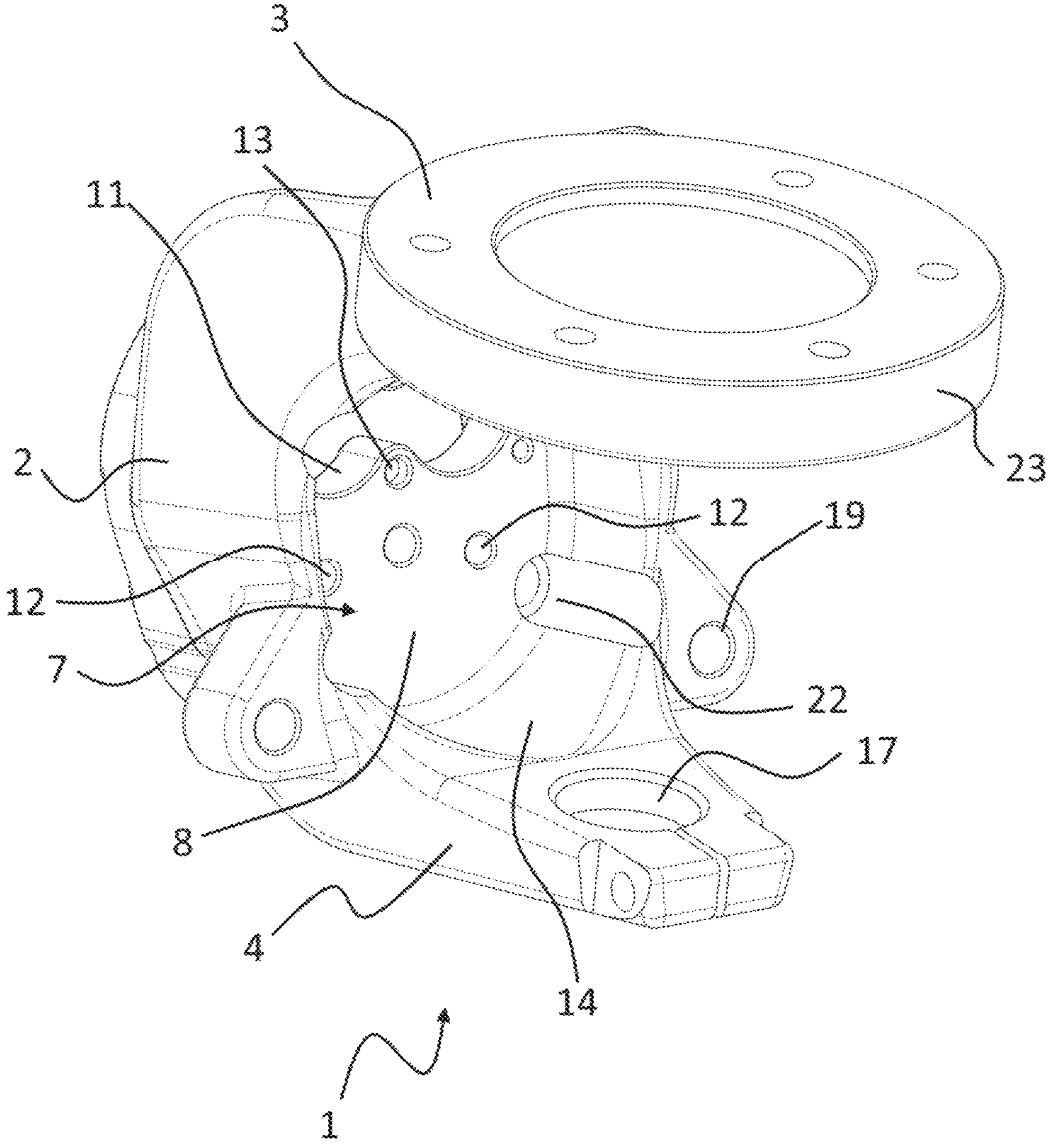
FIG. 1 shows the wheel-averted side of a steering knuckle according to one exemplary embodiment.

In the detailed description of embodiments below, the same reference signs denote substantially identical or identical parts in or on these embodiments. However, for better clarification, the embodiments shown in the figures are not always shown to scale.

FIGS. 1 to 6 show an exemplary embodiment of a steering knuckle 1. The steering knuckle 1 includes a wheel connection section 2, an upper steering attachment section 3 connected to the wheel connection section 2, and a lower steering attachment section 4 connected to the wheel connection section 2. FIG. 7 shows the steering knuckle 1 of FIGS. 1 to 6 in a corner module 18. The wheel connection section 2 is configured for connecting the steering knuckle 1 to the vehicle wheel 5 (see FIGS. 7 and 8). The upper steering attachment section 4 is configured to provide a connection of the steering knuckle 1 to a steering drive 6 (see FIG. 7).

Figure 3:
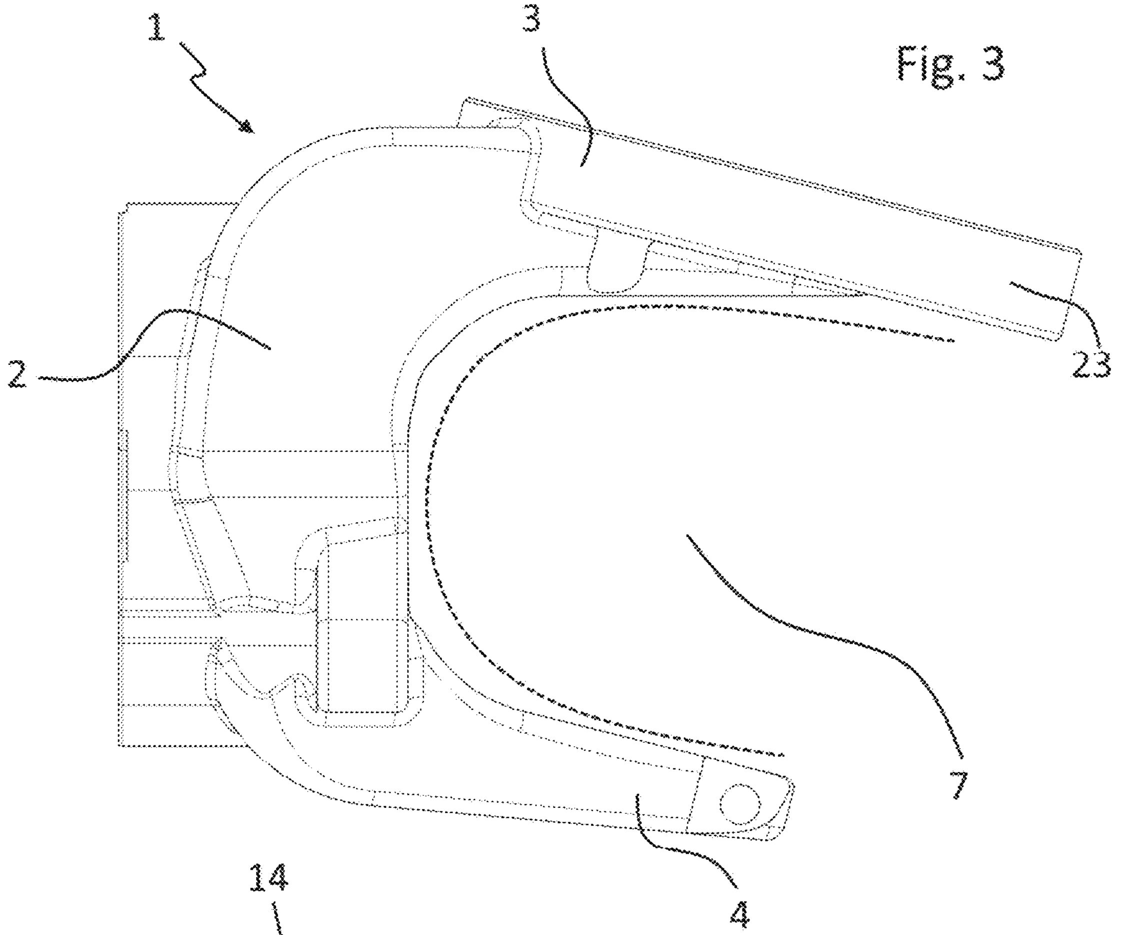
FIG. 3 shows a side view of the steering knuckle according to the embodiment of FIG. 1.
Figure 4:
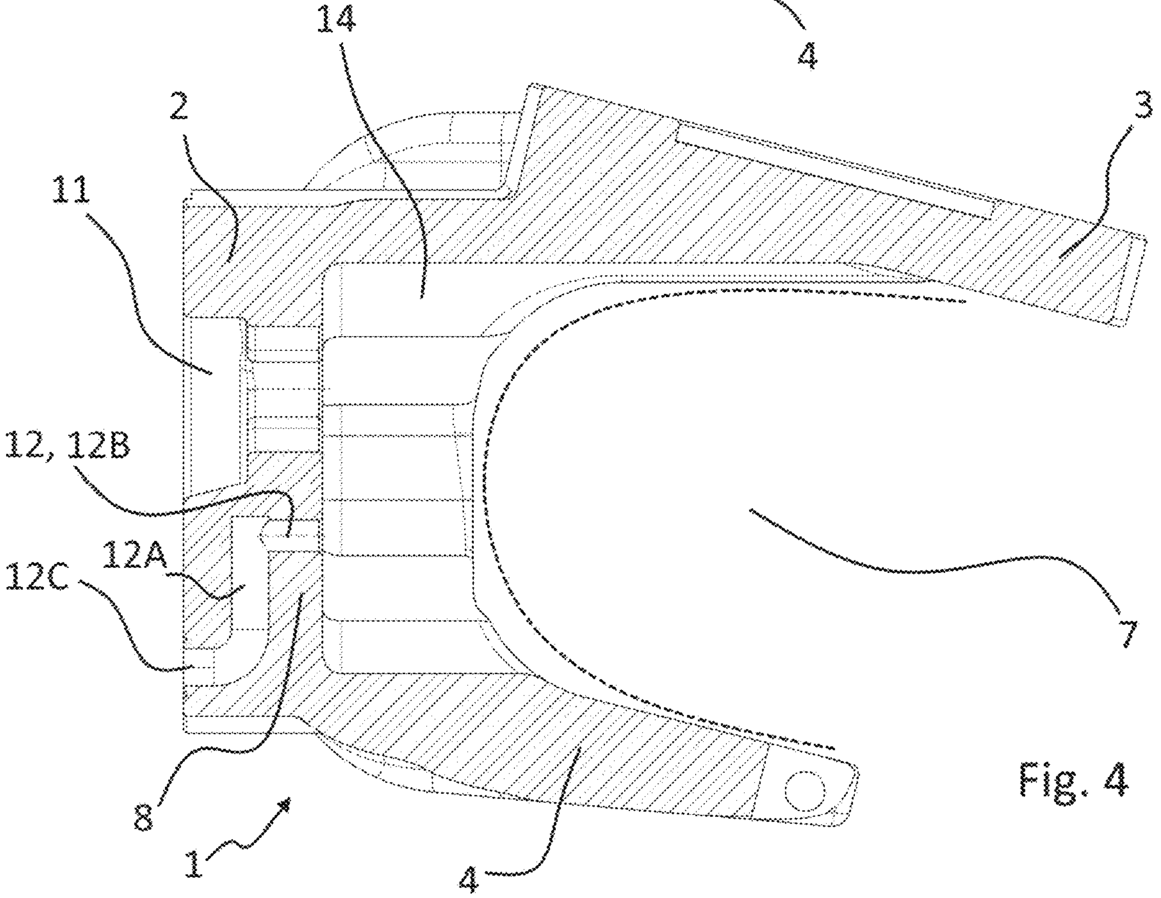
FIG. 4 shows a sectioned side view of the steering knuckle according to the embodiment of FIG. 1.

The upper steering attachment section 3, the wheel connection section 2, and the lower steering attachment section 4 together delimit a recess 7 on at least three sides (see in particular FIGS. 3 and 4). As a result, a connector section 8 arranged in the wheel connection section 2 delimits an inner end of the recess 7 and is configured for guiding at least one line 9, 10 (see FIG. 7, only the respective line end is shown there, for the sake of clarity) through the recess 7. This allows the lines 9, 10 to be guided through the steering knuckle 1 into the vehicle wheel 5, while being able at the same time to provide space for protected elastic deformations of the lines 9, 10 during a steering movement of the vehicle wheel 5.

The steering knuckle 1 may be formed in one piece. In other words, the wheel connection section 2, the upper steering attachment section 3, and the lower steering attachment section 4 are produced as one continuous component, e.g., as an aluminum cast piece.

A plurality of connector openings 11, 12, 13, through which the lines 9, 10 and/or a connector for the lines 9, 10 can be guided, is arranged in the connector section 8. The connector opening 11 is a double opening in the form of a horizontal 8 for a double cable of a power supply line 9 of a wheel hub motor.

Two connector openings 12 are fluid connectors, each comprising a bore 12A running in the connector section 8, wherein a first connector end 12B is arranged substantially parallel to, but offset from, a second connector end 12C (see in particular FIG. 4). Thus, fluid lines 10 guided through the recess 7 can be fastened at a smallest possible radial distance from the axis of rotation of the wheel, as a result of which the elastic deformation of the fluid lines 10 proceeds as symmetrically as possible during a steering movement and the maximum deformation of the fluid lines 10 is limited. At the same time, it is possible to conduct the fluid to another desired radial or axial position in the interior of the vehicle wheel 5, without a fluid line 10 within the vehicle wheel 5 having to be bent more than necessary. For example, for cooling the wheel hub motor or its electronics, a line of cooling fluid is often required at and from larger radial distances from the axis of rotation of the wheel. One fluid connector is configured as an inflow and one fluid connector is configured as an outflow.

Figure 5:
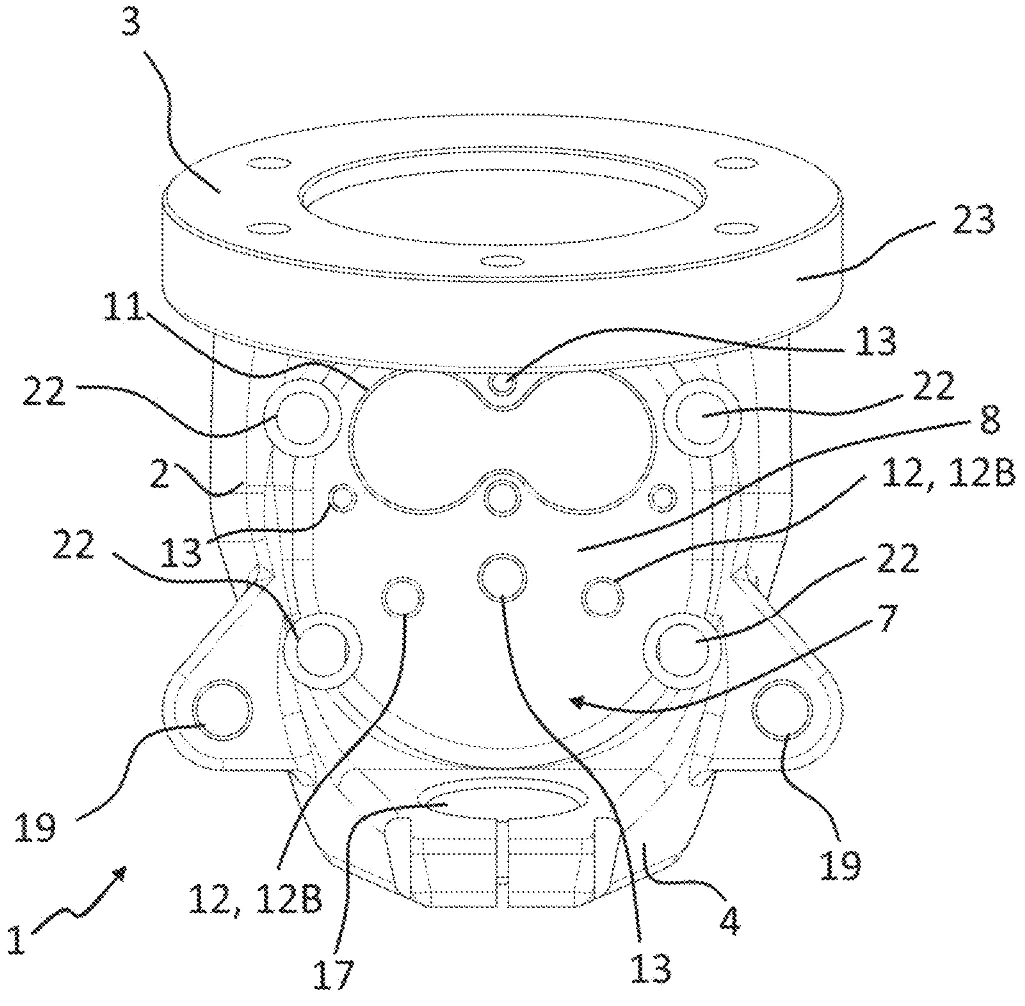
FIG. 5 shows a front view of the steering knuckle according to the embodiment of FIG. 1.

The figures show (five) further connector openings 13, which can be provided, for example, for guiding and for connecting further signal cables and/or power supply cables in particular for a wheel brake, a wheel hub motor or sensors (see FIGS. 1 and 5).

The connector section 8 is arranged in a shell base of a shell-shaped section 14 of the steering knuckle 1. In some sections, the recess 7 may then even be surrounded on five sides by the steering knuckle 1. This creates a protected region for guiding or for connecting the lines 9, 10. The shell-shaped section 14 is arranged in the axial direction completely within a wheel rim 15 of the vehicle wheel 5 (see also FIG. 7).

It can be seen from FIGS. 3 and 4 that, in a side view of the steering knuckle, the upper steering attachment section 3, the wheel connection section 2, and the lower steering attachment section 4 together have a substantially C-shaped cross section (indicated here by dashed lines in the recess 7 which can then also have such a shape in side view). This shape ensures protection of the lines 9, 10 and at the same time leaves sufficient horizontal pivoting space for a lower wheel carrier 16 which is connected to the lower steering attachment section 4 and which can partially move within the recess 7 (see also FIG. 7). In particular, a C shape allows large steering angles of up to ±90° and more. The C shape here is a rounded C shape, which improves the force flux and makes the steering knuckle 1 more stable.

The lower steering attachment section 4 includes half of a steering knuckle joint 17, which is configured as a ball joint (see in particular FIGS. 5 and 7), for connecting to the lower wheel carrier 16 of the corner module 18 (or alternatively for connecting to a wheel suspension of a vehicle). A ball joint allows rotation about an axis of rotation of the steering drive 6 and also a pitching movement between the steering knuckle 1 and the lower wheel carrier 16, e.g., in the event of a suspension movement between vehicle wheel 5 and body or possibly in the event of a driving height adjustment.

The wheel connection section 2 includes two brake connection geometries 19 for connecting to a brake caliper 20 of a disc brake. As can be seen from FIG. 7, a brake disc 21 here is engaged around from radially on the inside by the brake caliper 20. This solution allows a simple, space-saving and stable installation of the brake caliper 20 of the disc brake. For example, a brake actuator of the brake caliper 20 can be arranged axially completely within the wheel rim 15 (i.e. can be rotated toward the inside of the wheel), as a result of which the brake actuator, depending on the positioning in the direction of rotation, is not in the way of a large-angled steering movement of the vehicle wheel (e.g. when arranged at approximately 3 o'clock or at approximately 9 o'clock in the direction of rotation) or is protected from collisions with a curb (when arranged at approximately 6 o'clock). However, since parts of the brake caliper (apart from the brake actuator) can nevertheless protrude axially, the brake caliper is preferably arranged (as shown) in the installed state below the steering knuckle (e.g. at about 6 o'clock in the direction of rotation) in order to be in the way of large-angled steering movements as little as possible.

The steering knuckle 1 is arranged radially within the disc brake (e.g. within the brake disk 21) of the vehicle wheel 5, wherein all of the fastening elements (and associated brake connection geometries 19) between the steering knuckle 1 and the remaining vehicle wheel 5 are also radially arranged within the disc brake. This embodiment allows a easy mounting of the steering knuckle 1 and the brake disk 21 in the vehicle wheel 5 and simultaneously accessibility to the brake disk 21, e.g. for maintenance purposes.

Figure 2:
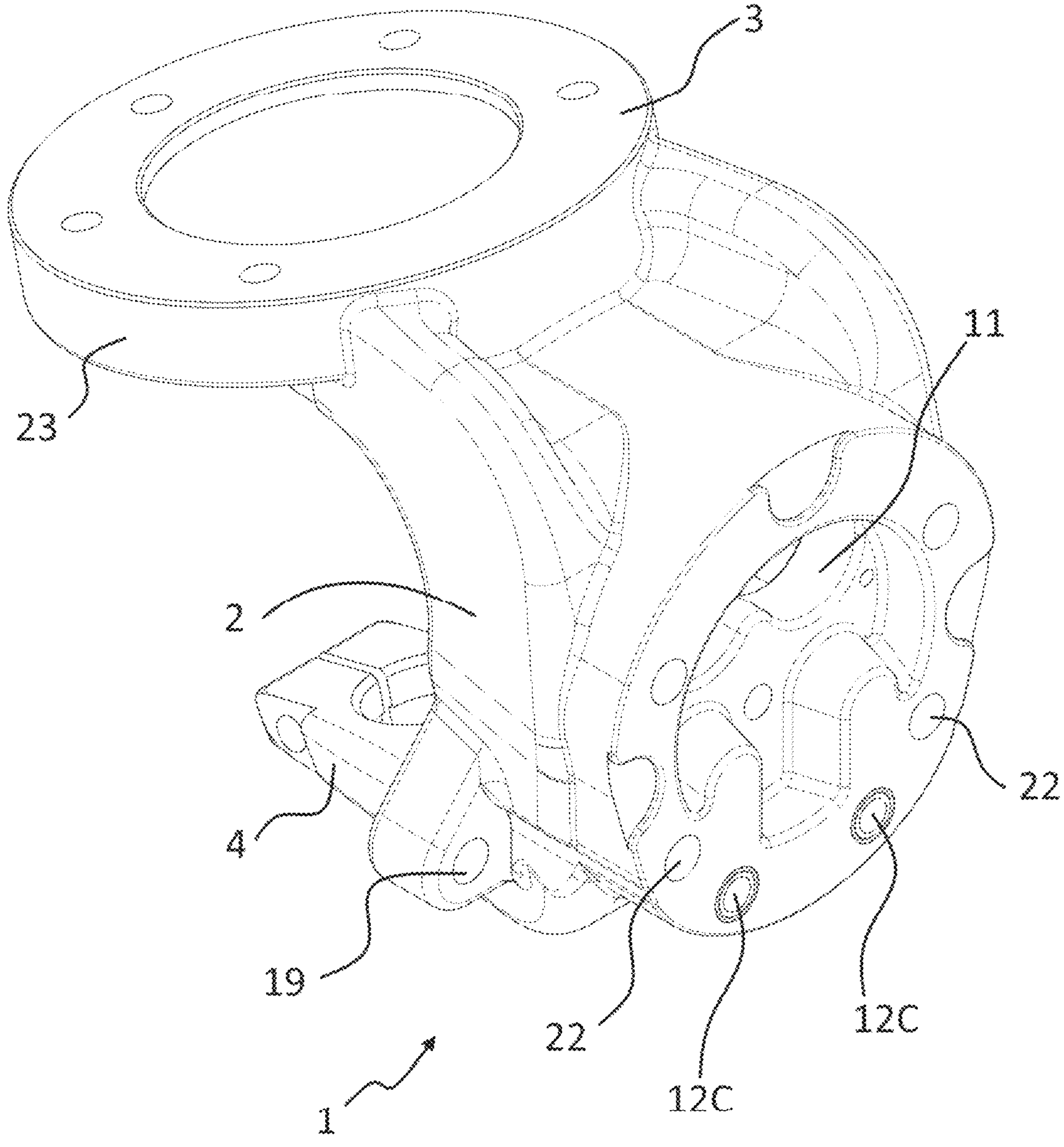
FIG. 2 shows the inner wheel side of the steering knuckle according to embodiment of FIG. 1.
Figure 6:
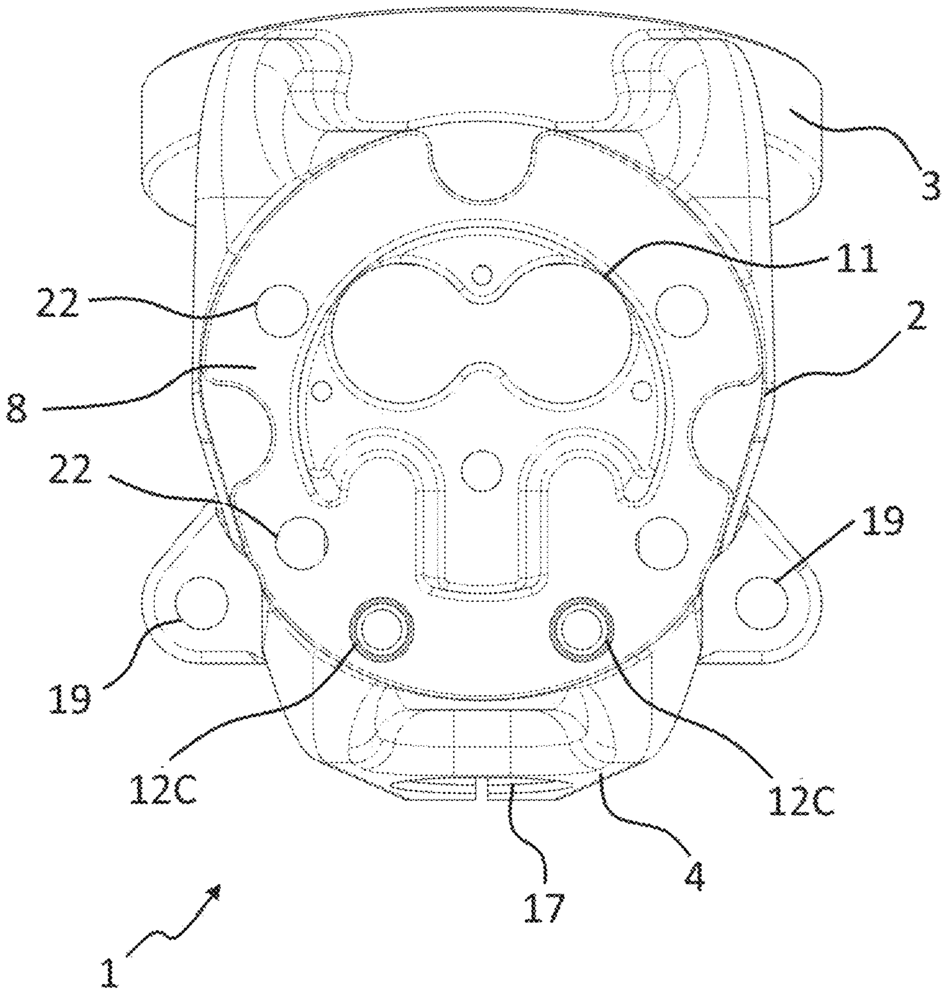
FIG. 6 shows a rear view of the steering knuckle according to the embodiment of FIG. 1.
Figure 7:
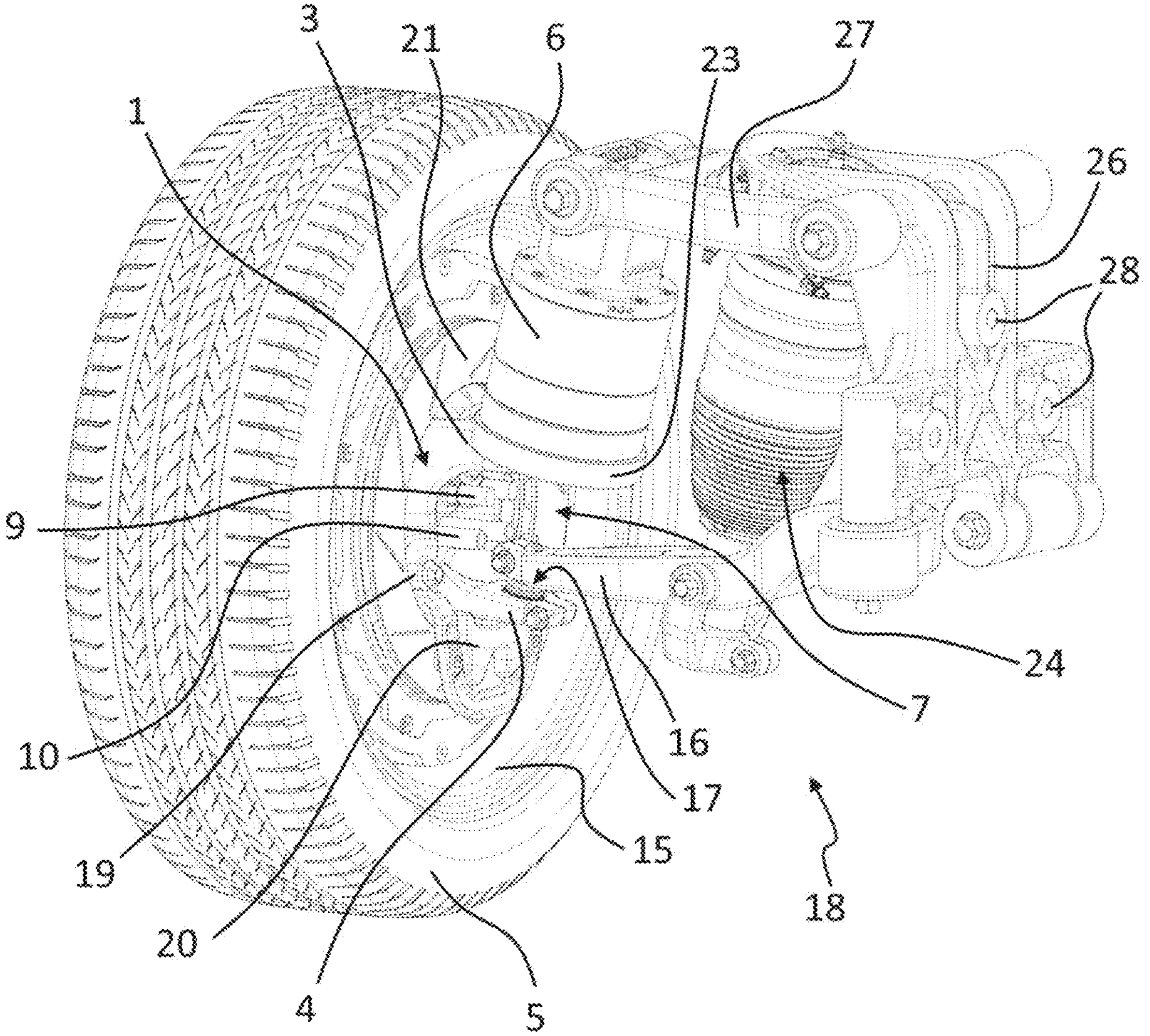
FIG. 7 shows a corner module according to one exemplary embodiment including a steering knuckle.

The wheel connection section 2 may comprise at least two (here four) wheel connection geometries 22 for connecting to the vehicle wheel 5 (see in particular FIGS. 2, 5 and 6). The connector openings 11, 12, 13 are arranged between the wheel connection geometries 22. For example, all of the connector openings 11, 12, 13 can be arranged within an imaginary circle running through the wheel connection geometries 22 (see in particular FIG. 5). The wheel connection geometries 22 allow the steering knuckle 1 to be fastened to the vehicle wheel 5 via a screw connection, rivet connection or similar.

The upper steering attachment section 3 has a substantially circular-disk-shaped steering attachment disk 23, which frames an upper end of the recess 7 and forms an upper end of the steering knuckle 1. This allows a relatively large torque to be transmitted from the steering drive 6 to the steering knuckle 1, even in a compact design of a steering drive. The weight force exerted on the steering knuckle 1 can also be distributed better. The steering attachment disk 23 continues to provide protection from above for the lines 9, 10 running through the recess 7. The steering attachment disk 23 may comprise connection geometries for connection to a rotor or a transmission of the steering drive 6.

Figure 8:
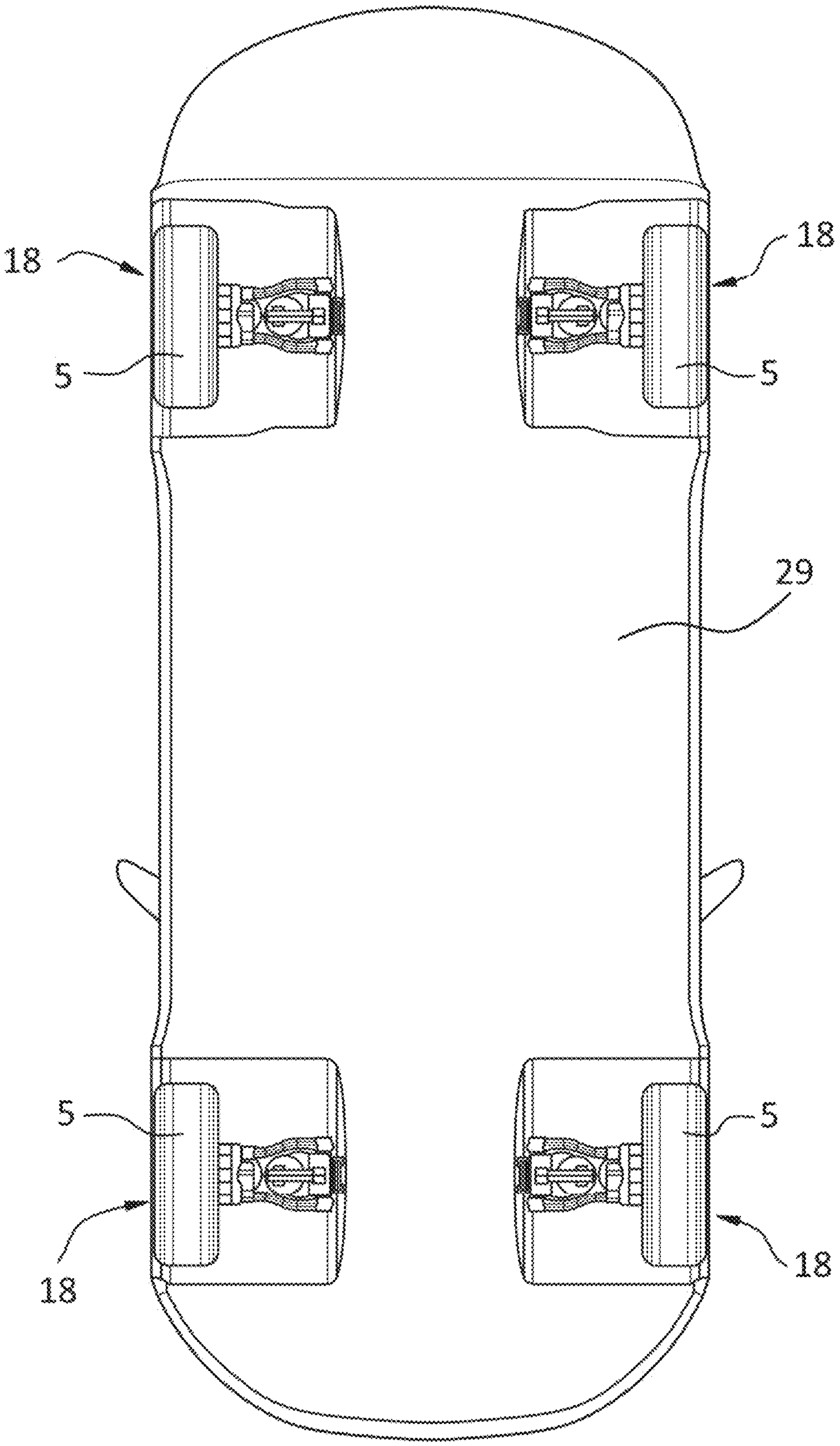
FIG. 8 shows a vehicle according to one exemplary embodiment including four corner modules.

FIGS. 7 and 8 show embodiments of a corner module 18 of a vehicle 29. The corner module comprises a steering knuckle 1, a vehicle wheel 5 connected to the steering knuckle, and a steering drive 6 which is connected to the upper steering attachment section 4 and is assigned to the individual vehicle wheel 5. Such a corner module 18 is suitable for permitting wheel-specific steering with a large maximum steering angle) (>45°) and at the same time for guiding a plurality of lines 9, 10 in a protected manner into the vehicle wheel 5 in order to control or supply one or more wheel components.

The steering knuckle 1 frames the recess 7 substantially on the wheel side by the wheel connection section 2, from below through the lower steering attachment section 4 and from above by the upper steering attachment section 3. As a result, the lines are protected on three sides and nevertheless do not collide with the steering knuckle 1 during a large-angled) (>45°) steering movement carried out by the steering drive 6. It is also possible to connect the lines 9, 10 as centrally as possible, i.e. with a small radius of vehicle wheel 5 and axially within the wheel rim 15.

The steering drive 6 may be configured to provide the vehicle wheel 5 with independent steerability in an angular range of at least ±60°, preferably of at least ±75° and particularly preferably of at least ±90°. The lines 9, 10 then perform an elastic deformation about a corresponding angle at least partially in the recess 7 during a steering movement. The steering knuckle together with its recess 7 allows protected elastic deformation of the lines 9, 10, without coming to a collision, overstretching of the lines or inelastic deformation of one of the lines 9, 10 during a steering movement.

The corner module 18 also includes a suspension 24 which is arranged between the lower wheel carrier 16 and a main carrier 26. The suspension 24 absorbs vibrations between the vehicle wheel 5 and the body and may comprise damping. The suspension may be a gas spring, but other types of suspension may also be used. The main carrier 26 is connected to the steering drive 6 via an upper wheel carrier 27, which can have at least one rotary joint at each end. The main carrier 26 comprises (here three) body connection geometries 28 for connection to the body of the vehicle 29.

FIG. 8 shows a vehicle 29 comprising four such corner modules 18. This permits flexible novel body concepts, since there is no need for a central engine with a mechanical connection to the vehicle wheels 5 and a large portion of the mechanical steering and suspension elements between the vehicle wheels 5. At the same time, very large steering angles can be realized, which, for example, permit small turning circles and parking sideways in a parking space.

The present embodiments have been described herein in an illustrative manner, and it is to be understood that the terminology which has been used is intended to be in the nature of words of description rather than of limitation. Obviously, many modifications and variations of the embodiments are possible in light of the above teachings. The invention may be practiced otherwise than as specifically described within the scope of the appended claims.

What is claimed is:

1. A steering knuckle for a vehicle wheel, the steering knuckle comprising:

a wheel connection section configured for connecting the steering knuckle to the vehicle wheel;

an upper steering attachment section connected to the wheel connection section and configured to provide a connection of the steering knuckle to a steering drive; and a lower steering attachment section connected to the wheel connection section;

wherein the upper steering attachment section, the wheel connection section, and the lower steering attachment section together delimit a recess on at least three sides such that a connector section arranged in the wheel connection section delimits an inner end of the recess and is configured for guiding at least one line through the recess, and wherein the wheel connection section includes at least one brake connection geometry for connecting to a brake caliper of a disc brake.

2. The steering knuckle as set forth in claim 1, wherein the connector section defines at least one connector opening, through which the at least one line and/or a connector for the at least one line may be guided.

3. The steering knuckle as set forth in claim 2, wherein the at least one connector opening is further defined as a fluid connector which includes a bore running in the connector section, wherein a first connector end is arranged substantially parallel to, but offset from, a second connector end.

4. The steering knuckle as set forth in claim 1, wherein the connector section is located in a shell base of a shell-shaped section of the steering knuckle.

5. The steering knuckle as set forth in claim 1, wherein the upper steering attachment section, the wheel connection section, and the lower steering attachment section together have a substantially C-shaped cross section in a side view of the steering knuckle.

6. The steering knuckle as set forth in claim 1, wherein the lower steering attachment section includes half of a steering knuckle joint.

7. The steering knuckle as claimed in claim 6, wherein the steering knuckle joint is configured as a ball joint, for connecting to a lower wheel carrier of a corner module and/or for connecting to a wheel suspension of a vehicle.

8. The steering knuckle as claimed in claim 6, wherein the wheel connection section comprises at least two wheel connection geometries for connecting to the vehicle wheel, wherein the at least one connector opening is arranged between the wheel connection geometries.

9. The steering knuckle as set forth in claim 1, wherein the upper steering attachment section includes a substantially circular-disc-shaped steering attachment disk, which frames an upper end of the recess and forms an upper end of the steering knuckle.

10. A corner module for a vehicle, comprising:

a steering knuckle including a wheel connection section, an upper steering attachment section connected to the wheel connection section, and a lower steering attachment section connected to the wheel connection section, wherein the upper steering attachment section, the wheel connection section, and the lower steering attachment section together delimit a recess on at least three sides such that a connector section arranged in the wheel connection section delimits an inner end of the recess and is configured for guiding at least one line through the recess;

a vehicle wheel connected to the wheel connection section of the steering knuckle; and a steering drive connected to the upper steering attachment section of the steering knuckle and assigned to the vehicle wheel, and wherein the wheel connection section includes at least one brake connection geometry for connecting to a brake caliper of a disc brake.

11. The corner module as set forth in claim 10, wherein at least one power supply line and/or at least one coolant line for a wheel hub motor arranged in the vehicle wheel runs through the connector section.

12. The corner module as set forth in claim 10, wherein at least one hydraulic line for a hydraulic brake arranged in the vehicle wheel runs through the connector section.

13. The corner module as set forth in claim 10, wherein the steering drive is configured to provide the vehicle wheel with independent steerability in an angular range of at least ±60°, wherein the at least one line carries out elastic deformation about a corresponding angle at least partially in the recess.

14. The corner module as set forth in claim 10, wherein the steering knuckle is arranged radially within a disc brake of the vehicle wheel, wherein any fastening elements between the steering knuckle and the vehicle wheel are also arranged radially within the disc brake.

* * * * *